United States Patent [19]

Suzuki

[11] Patent Number: 5,530,876
[45] Date of Patent: Jun. 25, 1996

[54] FLOPPY DISK CONTROLLER INCORPORATING STANDBY SIGNAL GENERATING FUNCTIONS FOR MOVING THE CONTROL FROM AN OPERATIONAL MODE TO A STANDBY MODE IF PREDETERMINED DRIVE CONDITIONS EXIST

[75] Inventor: Kenichi Suzuki, Tokyo, Japan

[73] Assignee: NEC Corporation, Tokyo, Japan

[21] Appl. No.: 131,700

[22] Filed: Oct. 5, 1993

[30] Foreign Application Priority Data

Oct. 7, 1992 [JP] Japan .................... 4-268735

[51] Int. Cl.$^6$ .................................. G06F 13/00
[52] U.S. Cl. ............... 395/750; 364/273; 364/273.2; 364/273.5; 364/DIG. 1
[58] Field of Search .............. 364/273, 273.1, 364/273.2, 273.5; 395/750

[56] References Cited

U.S. PATENT DOCUMENTS

| | | | |
|---|---|---|---|
| 4,980,836 | 12/1990 | Carter et al. | 364/483 |
| 5,274,277 | 12/1993 | Chan | 307/443 |
| 5,300,831 | 4/1994 | Pham et al. | 307/465 |
| 5,388,265 | 2/1995 | Volk | 395/750 |
| 5,404,546 | 4/1995 | Stewart | 395/750 |

FOREIGN PATENT DOCUMENTS 2264794  9/1993  United Kingdom .

OTHER PUBLICATIONS

"Method of Power On/Off Diskette Controller", IBM Technical Disclosure Bulletin, Sep. 29, 1986, vol. 29, No. 4, pp. 1723–1724.

"Method to Provide Low Power Standby Mode for Online Devices", IBM Technical Disclosure Bulletin, Apr. 1987, vol. 29, No. 11, p. 4763.

Primary Examiner—Tod R. Swann
Assistant Examiner—Frank J. Asta
Attorney, Agent, or Firm—Young & Thompson

[57] ABSTRACT

A floppy disk controller connected between a host system and several floppy disk units has a control circuit, a control register, and a standby control signal generating circuit. The control circuit is connected between the host system and the floppy disk units, and controls the floppy disk units. The control register is connected to the host system and to the floppy disk units, and has several ports, one for driving each floppy disk unit, the control register being written to by the host system. The standby control signal generating circuit is connected between all of the ports of the control register and the control circuit, and detects only a state where all of the floppy disk units are not driven, and always generates a standby control signal upon detection of this state, and transmits this standby control signal to the control circuit, to thereby move the control circuit from an operation mode to a standby mode. The floppy disk controller may also have a data register, a standby code decoder, and additional logic circuitry to transmit a standby control signal to the control circuit. The floppy disk controller may also have a digital output register having several ports, one to drive each of the floppy disk units, this digital output register being written to by the host system.

8 Claims, 6 Drawing Sheets

FLOPPY DISK CONTROLLER INCORPORATING STANDBY SIGNAL GENERATING FUNCTIONS FOR MOVING THE CONTROL FROM AN OPERATIONAL MODE TO A STANDBY MODE IF PREDETERMINED DRIVE CONDITIONS EXIST

BACKGROUND OF THE INVENTION

1. Field of the Invention

The present invention relates to a floppy disk controller connected between a host system and a plurality of floppy disk units.

2. Description of the Related Art

Generally, connected between a host system and floppy disk units is a floppy disk controller which performs a read/write operation upon the floppy disk units, mechanically drives the floppy disk units, and the like.

When the floppy disk units are not accessed and not driven, the floppy disk controller is transferred from an operation mode to a standby mode, thus reducing the power dissipation. For example, in a standby mode, the generation of an internal clock signal is stopped, however, the content of an internal random access memory (RAM), the values of ports, and the like are maintained.

A prior art floppy disk controller is controlled by the host system to transfer from an operation mode to a standby mode, which will be later explained in detail. As a result, a control program of the host system becomes complex, and also a large power dissipation is required to operate the floppy disk controller, since the standby state of the floppy disk controller cannot be precisely controlled.

SUMMARY OF THE INVENTION

It is an object of the present invention to provide a floppy disk controller which can simplify the control program of the host system and can reduce the power dissipation of the floppy disk controller.

According to the present invention, in a floppy disk controller between a host system and a plurality of floppy disk units, a control register having a plurality of ports each for driving one of the floppy disk units is connected to a logic circuit such as a NOR circuit, to thereby detect that all of the floppy disk units are not driven. When all of the floppy disk units are not driven, the logic circuit generates a standby control signal. Thus, the standby control signal per se can be generated within the floppy disk controller without direct control of the host system.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of embodiments, prior art floppy disk controllers will be explained with reference to FIGS. 1 and 2.

Figure 1:
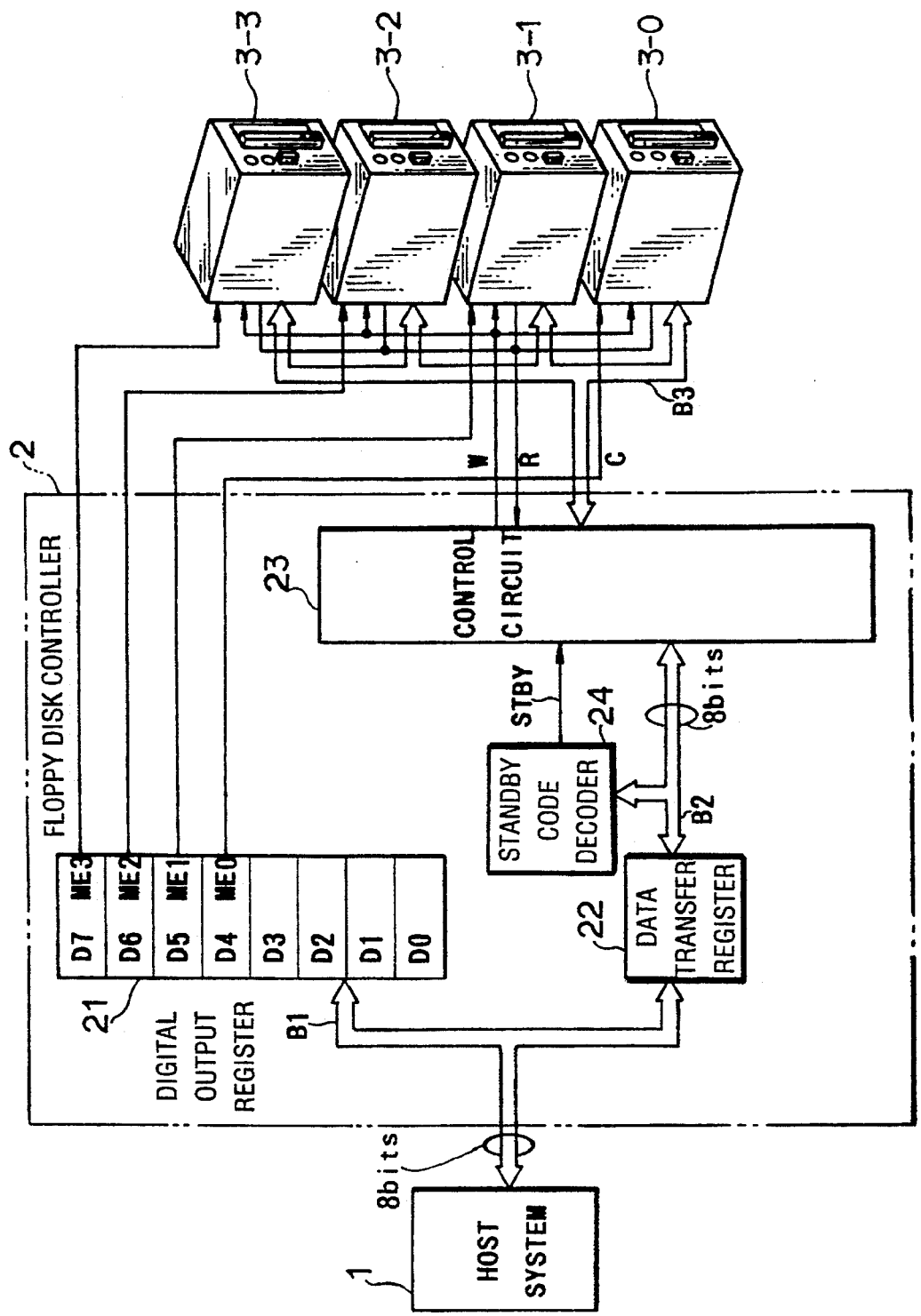
FIGS. 1 and 2 are block circuit diagrams illustrating prior art floppy disk controllers.

In FIG. 1, which illustrates a prior art floppy disk controller (see: USERS MANUAL "μPD72069 FLOPPY DISK CONTROLLER", NEC Corporation, Tokyo, Japan, Jan. 1991, p. 64), reference numeral 1 designates a host system, 2 designates a floppy disk controller (FDC), and 3-0, 3-1, 3-2 and 3-3 designate floppy disk units. Note that the connection between the floppy disk controller 2 and the floppy disk units 3-0, 3-1, 3-2 and 3-3 can be carried out by using a star connection or a daisy chain connection.

Also, the floppy disk controller 2 includes an 8-bit digital output register (DOR) 21 which has four ports ME0, ME1, ME2 and ME3 for turning ON and OFF the motors of the floppy disk units 3-0, 3-1, 3-2 and 3-3, respectively. The digital output register 21 is written to via an 8-bit data bus B1 by the host system 1.

Further, the floppy disk controller includes a data register (DTR) 22 which transfer data or commands from the host system 1 to a control circuit 23 or vice versa. The data register 22 is also connected via the data bus B1 to the host system 1, which is connected via an internal data bus B2 to the control circuit 23.

The control circuit 23 performs a parallel-to-serial conversion upon parallel data of the internal bus B2, and transmits the serial data as write data W to one of the floppy disk units 3-0, 3-1, 3-2 and 3-3. Conversely, the control circuit 23 performs a serial-to-parallel conversion upon serial data as read data R from one of the floppy disk units 3-0, 3-1, 3-2 and 3-3, and transmits the parallel data to the data register 22. Further, the control circuit 23 generates various control signals C and transmits them to the floppy disk units 3-0, 3-1, 3-2 and 3-3. Note that the control circuit 23 incorporates a parallel-to-serial converter, a serial-to-parallel converter, an internal RAM, an internal clock generator, and the like, which are not shown.

In FIG. 1, in order to put the floppy disk controller 2, i.e., the control circuit 23 in a standby mode, a standby code decoder 24 is connected to the data bus B2. As a result, when the host system 1 generates a standby command having a special code and writes it into the data register 22, the standby code decoder 24 detects it to generate a standby control signal STBY. Thus, this standby control signal STBY is transmitted to the control circuit 23, so that the control circuit 23 is moved from an operation mode to a standby mode.

In the floppy disk controller of FIG. 1, however, the host system 1 has to generate a standby command for moving the floppy disk controller 2 to a standby mode, thus complicating the control program of the host system 1 and increasing the power dissipation, as explained above.

Figure 2:
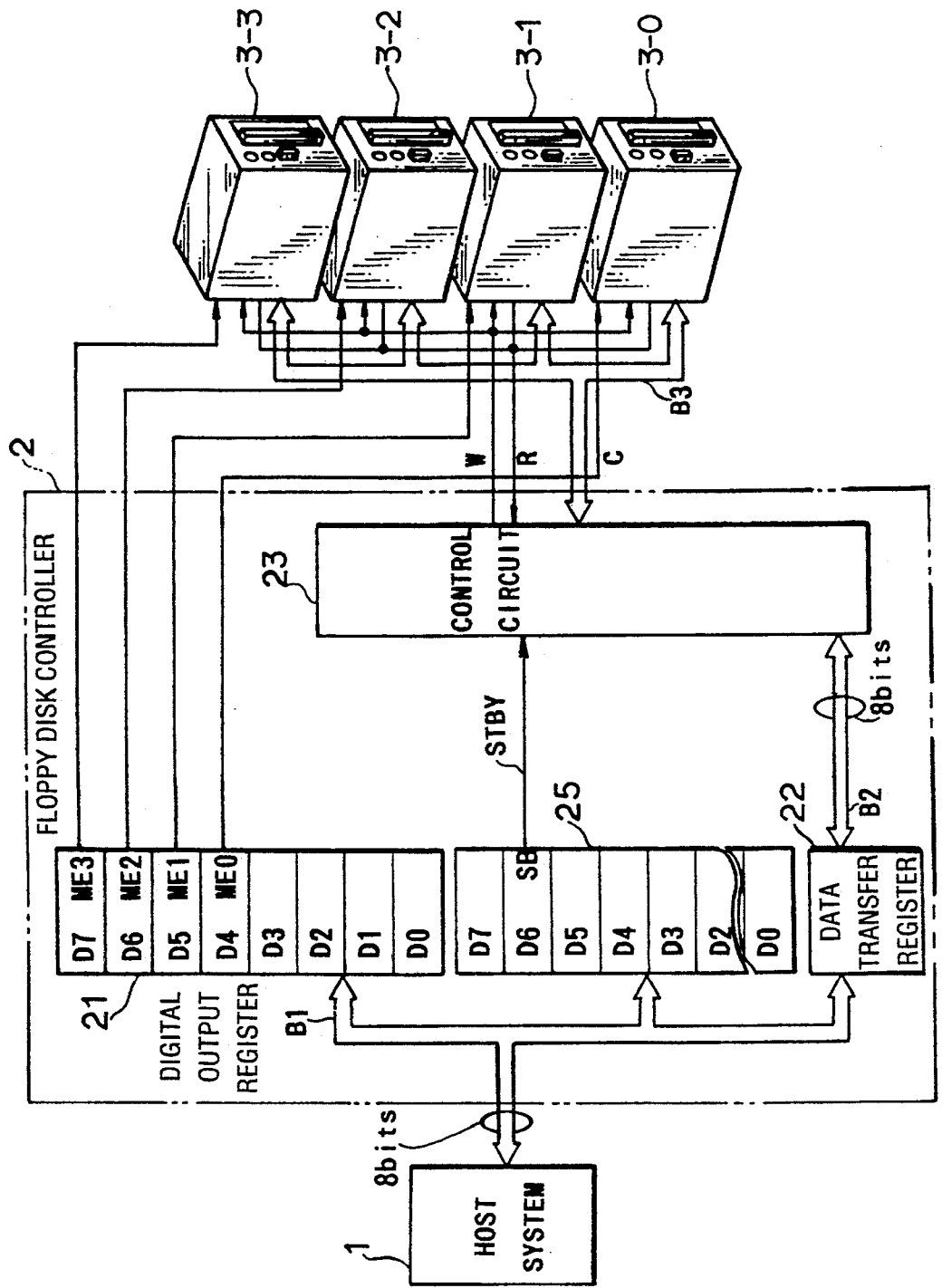

In FIG. 2, which illustrates another prior art floppy disk controller (see: USERS MANUAL "μPD72070 FLOPPY DISK CONTROLLER", NEC Corporation, Sep. 1992, P. 18), a data rate register (DRR) 25 for storing a data rate for changing drive control signals is provided instead of the standby code decoder 24 of FIG. 1. The data rate register 25 has a port SB for generating a standby control signal STBY.

In FIG. 2, in order to put the floppy disk controller 2, i.e., the control circuit 23 in a standby mode, when the host system 1 writes "1" into the port SB of the data rate register 25 via the data bus B1, the data rate register 25 generates a standby control signal STBY and transmits it to the control circuit 23, thus putting it in a standby mode.

Also, in the floppy disk controller of FIG. 2, the host system 1 has to write "1" into the data rate register 25 for moving the floppy disk controller 2 to a standby mode, thus complicating the control program of the host system 1 and increasing the power dissipation, as explained above.

Figure 3:
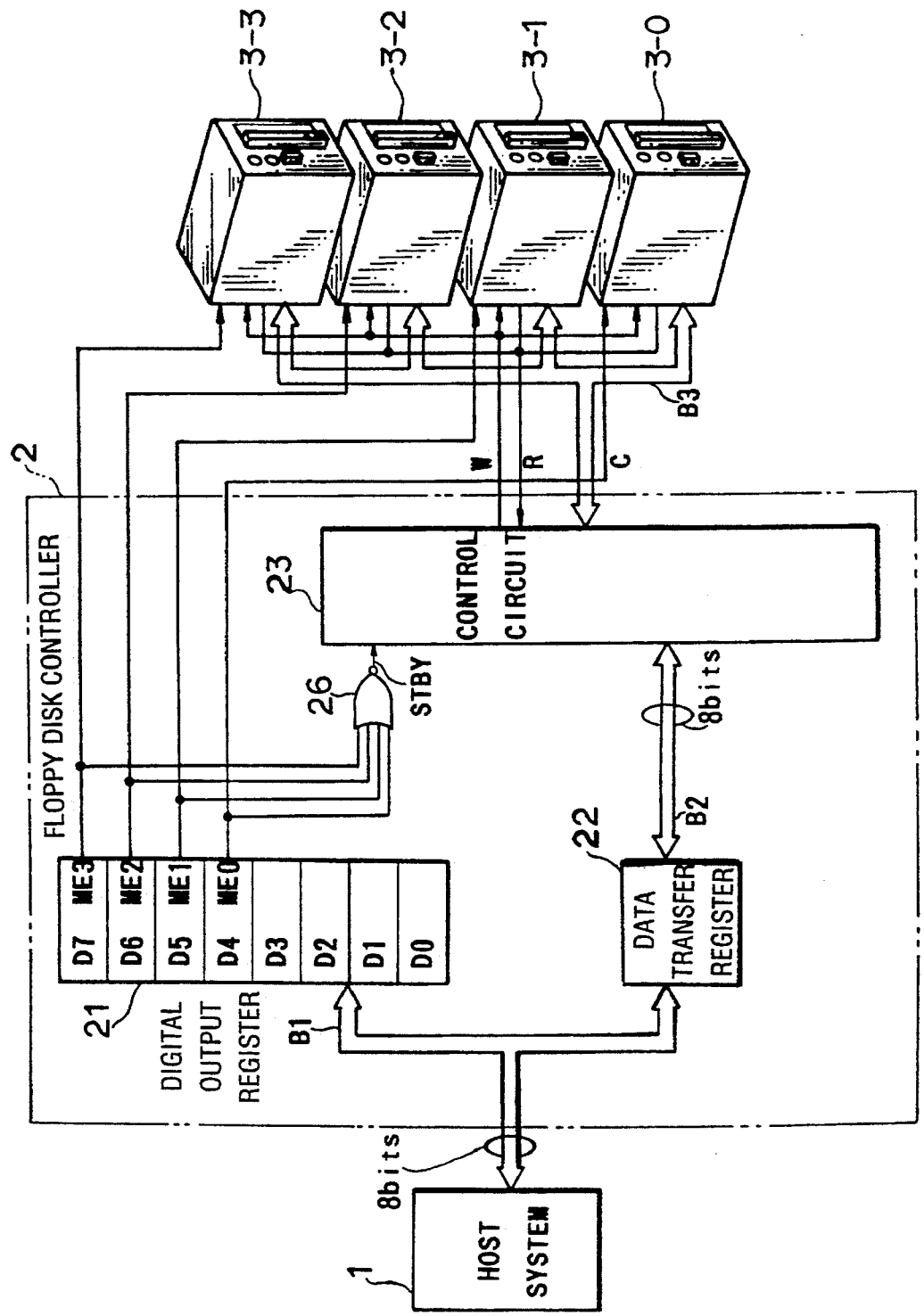
FIGS. 3, 4, 5 and 6 are block circuit diagrams illustrating first, second, third and fourth embodiments, respectively, of the floppy disk controller according to the present invention.

In FIG. 3, which illustrates a first embodiment of the present invention, a NOR circuit 26 is provided instead of the standby code decoder 24 of FIG. 1 and the port SB of the data rate register 25 of FIG. 2. The NOR circuit 26 is connected to all the ports ME0, ME1, ME2 and ME3 of the digital output register 21. Therefore, when the values of all the ports ME0, ME1, ME2 and ME3 are "0", so that all the motors of the floppy disk units 3-0, 3-1, 3-2 and 3-3 are turned OFF, the output of the NOR circuit 26, i.e., the standby control signal STBY becomes "1", thus moving the control circuit 23 from an operation mode to a standby mode.

That is, in an operation mode, at least one of the ports ME0, ME1, ME2 and ME3 of the digital output register 21 is made "1" by the host system 1, so that the corresponding motor is driven to perform an access upon the corresponding floppy disk unit. Conversely, when all of the ports ME0, ME1, ME2 and ME3 of the digital output register 21 are "0", all of the motors of the floppy disk units 3-0, 3-1, 3-2 and 3-3 are stopped, so that no access is performed upon the floppy disk units 3-0, 3-1, 3-2 and 3-3. Therefore, a standby control signal STBY can be generated by detecting such a state where all of the ports ME0, ME1, ME2 and ME3 of the digital output register 21 are "0".

Figure 4:
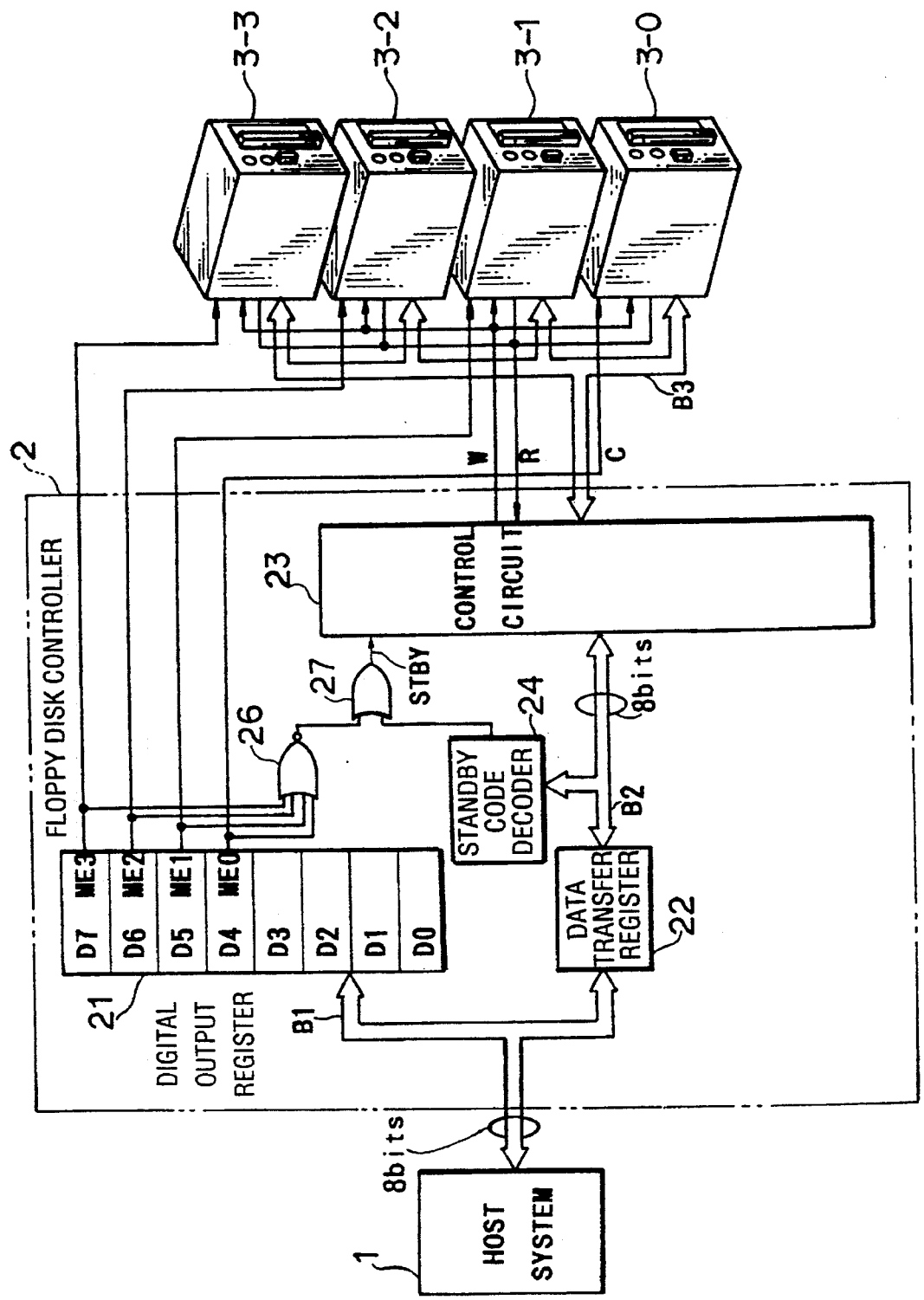

In FIG. 4, which illustrates a second embodiment of the present invention, the floppy disk controller 2 of FIG. 3 is combined with the prior art floppy disk controller 2 of FIG. 1 by adding an OR circuit 27. That is, the OR circuit 27 transmits the standby control signal from the NOR circuit 26 or the standby control signal from the standby code decoder 24 to the control circuit 23. Thus, the floppy disk controller 2 of FIG. 4 is compatible with the prior art floppy disk controller 2 of FIG. 1.

Figure 5:
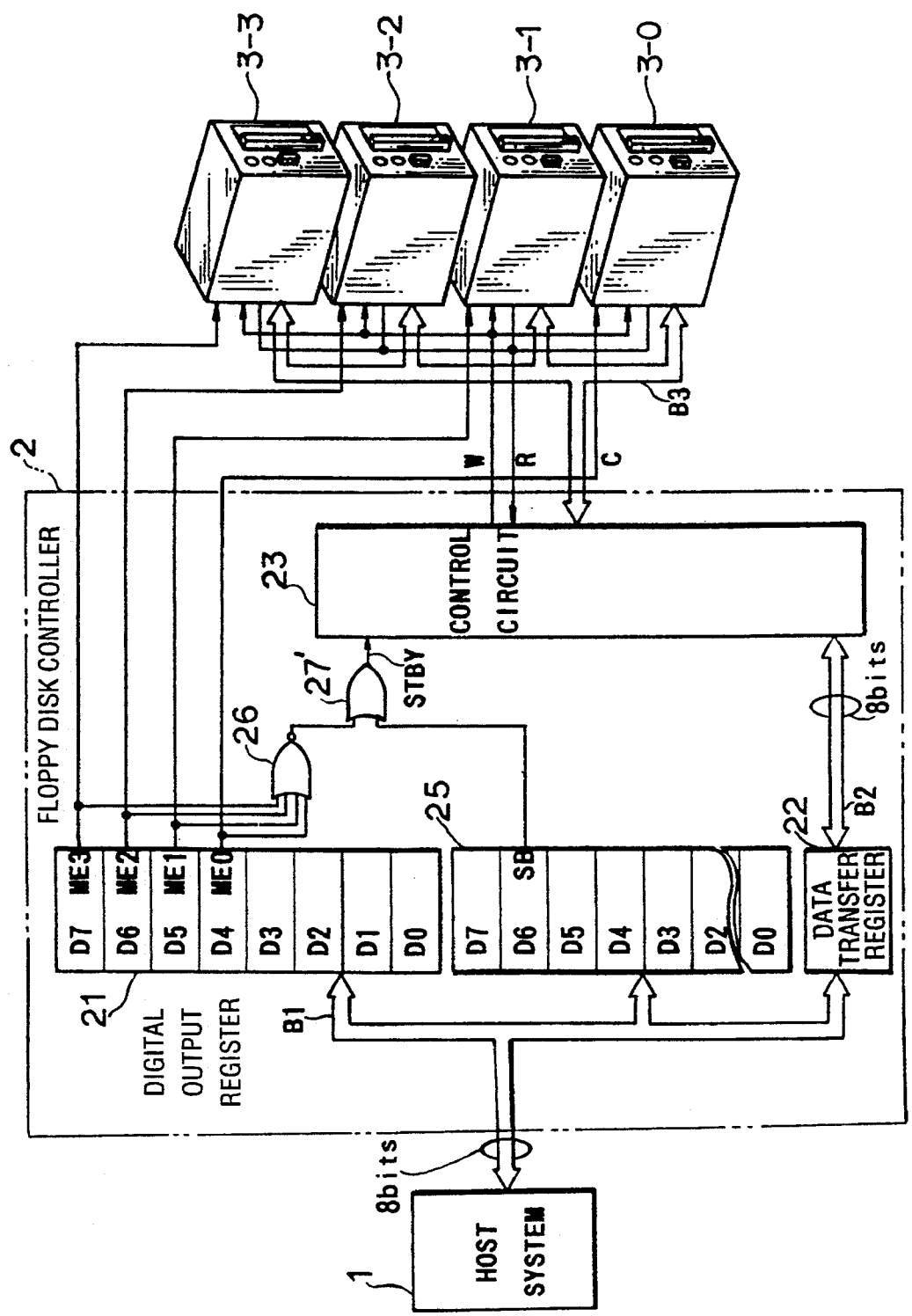

In FIG. 5, which illustrates a third embodiment of the present invention, the floppy disk controller 2 of FIG. 3 is combined with the prior art floppy disk controller 2 of FIG. 2 by adding an OR circuit 27'. That is, the OR circuit 27' transmits the standby control signal from the NOR circuit 26 or the standby control signal from the port SB of the data rate register 25 to the control circuit 23. Thus, the floppy disk controller 2 of FIG. 4 is compatible with the prior art floppy disk controller 2 of FIG. 2.

Figure 6:
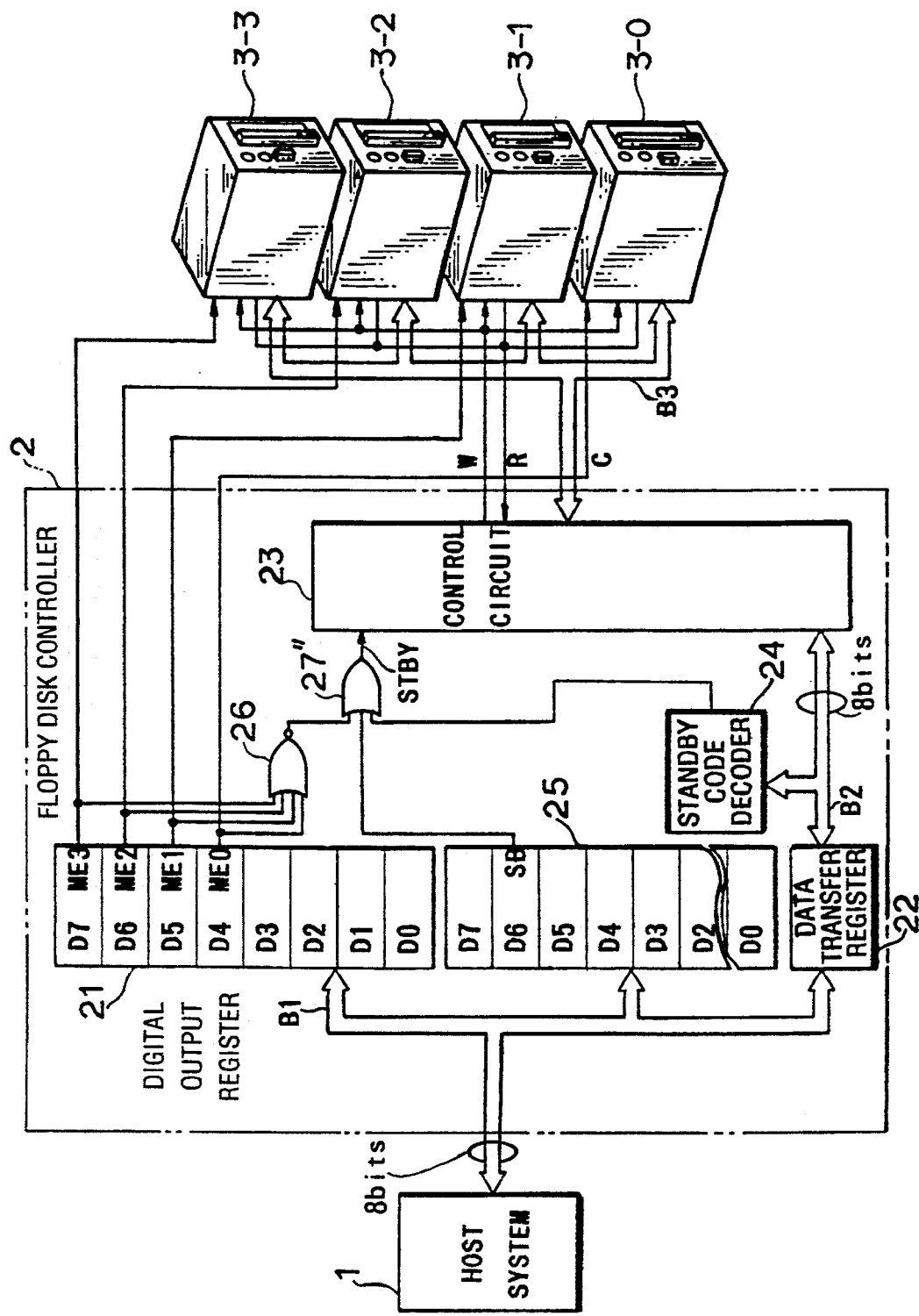

In FIG. 6, which illustrates a fourth embodiment of the present invention, the floppy disk controller 2 of FIG. 3 is combined with the prior art floppy disk controller 2 of FIG. 1 and the prior art floppy disk controller 2 of FIG. 2 by adding an OR circuit 27". That is, the OR circuit 27" transmits the standby control signal from the NOR circuit 26, the standby control signal from the standby code decoder 24, or the standby control signal from the data rate register 25 to the control circuit 23. Thus, the floppy disk controller 2 of FIG. 4 is compatible with both the prior art floppy disk controller 2 of FIG. 1 and the prior art floppy disk controller of FIG. 2.

The floppy disk controller as illustrated in FIG. 4, 5 or 6 that is compatible with the prior art floppy disk controllers can be also connected to the host system 1 which incorporates a prior art control program, which is helpful in reducing the manufacturing cost.

As explained hereinbefore, according to the present invention, since a standby control signal can be generated within the floppy disk controller without a direct control of the host system, the control program of the host system can be simplified, and also the power dissipation in the floppy disk controller can be reduced, since the standby state of the floppy disk controller can be precisely controlled.

I claim:

1. A floppy disk controller connected between a host system and a plurality of floppy disk units, comprising:

a control circuit, connected between said host system and said plurality of floppy disk units, for controlling said plurality of floppy disk units;

a control register connected to said host system and said plurality of floppy disk units, said control register having a plurality of ports each for driving one of said plurality of floppy disk units, said control register being written to by said host system;

a standby control signal generating circuit, connected between all of said plurality of ports of said control register and said control circuit, for detecting only a state where all of said plurality of floppy disk units are not driven, to always generate a standby control signal when said state is detected and to transmit said standby control signal to said control circuit, thereby moving said control circuit from an operation mode to a standby mode on the basis of said standby control signal.

2. A floppy disk controller as set forth in claim 1, further comprising:

a data register connected between said host system and said control circuit;

a standby code decoder, connected to said data register, for generating a standby control signal when the content of said data register coincides with a predetermined standby code; and a logic circuit, connected to said standby control signal generating circuit, said standby code decoder and said control circuit, for transmitting a standby control signal from one of said standby control signal generating circuit and said standby code decoder to said control circuit.

3. A floppy disk controller as set forth in claim 1, further comprising:

an additional control register, connected to said host system, said additional control register having a port for generating a standby control signal and being written to by said host system; and a logic circuit, connected to said standby control signal generating circuit, said additional control register and said control circuit, for transmitting a standby control signal from one of said standby control signal generating circuit and said additional control register to said control circuit.

4. A floppy disk controller as set forth in claim 1, further comprising:

a data register connected between said host system and said control circuit;

a standby code decoder, connected to said data register, for generating a standby control signal when the content of said data register coincides with a predetermined standby code;

an additional control register, connected to said host system, said additional control register having a port for generating a standby control signal and being written to by said host system; and a logic circuit, connected to said standby control signal generating circuit, said standby code decoder, said additional control register and said control circuit, for transmitting a standby control signal from one of said standby control signal generating circuit, said standby code decoder and said additional control register to said control circuit.

5. A floppy disk controller connected between a host system and a plurality of floppy disk units, comprising:

a control circuit, connected to said host system and said plurality of floppy disk units, for control said plurality of floppy disk units;

a digital output register connected to said host system and plurality of said floppy disk units, said digital output register having a plurality of ports each for driving one of said plurality of floppy disk units, said digital output register being written to by said host system;

a logic circuit, connected to all of said plurality of ports of said digital output register and said control circuit, for always generating a standby control signal when all of said plurality of floppy disk units are not driven, said generated standby control signal being transmitted to said control circuit, to thereby move said control circuit from an operation mode to a standby mode on the basis of said generated standby control signal.

6. A floppy disk controller as set forth in claim 5, further comprising:

a data register connected between said host system and said control circuit;

a standby code decoder, connected to said data register, for generating a standby control signal when the content of said data register coincides with a predetermined standby code; and an OR circuit, connected to said logic circuit, said standby code decoder and said control circuit, for transmitting a standby control signal from one of said logic circuit and said standby code decoder to said control circuit.

7. A floppy disk controller as set forth in claim 5, further comprising:

a data rate register, connected to said host system, for defining a drive timing, said data rate register having a port for generating a standby control signal and being written to by said host system; and an OR circuit, connected to said logic circuit, said data rate register and said control circuit, for transmitting a standby control signal from one of said logic circuit and said data rate register to said control circuit.

8. A floppy disk controller as set forth in claim 5, further comprising:

a data register connected between said host system and said control circuit;

a standby code decoder, connected to said data register, for generating a standby control signal when the content of said data register coincides with a predetermined standby code; and a data rate register, connected to said host system, for defining a drive timing, said data rate register having a port for generating a standby control signal and being written to by said host system; and an OR circuit, connected to said logic circuit, said standby code decoder, said data rate register and said control circuit, for transmitting a standby control signal from one of said logic circuit, said standby code decoder and said data rate register to said control circuit.

* * * * *